United States Patent
Tabirian et al.

(10) Patent No.: US 10,036,886 B2
(45) Date of Patent: Jul. 31, 2018

(54) BROADBAND OPTICS FOR MANIPULATING LIGHT BEAMS AND IMAGES

(71) Applicants: The United States of America as Represented by the Secretary of the Army, Washington, DC (US); Beam Engineering for Advanced Measurements Co., Orlando, FL (US)

(72) Inventors: Nelson V. Tabirian, Winter Park, FL (US); Sarik R. Nersisyan, Maitland, FL (US); Brian R. Kimball, Shrewsbury, MA (US); Diane M. Steeves, Franklin, MA (US)

(73) Assignees: Beam Engineering for Advanced Measurements Co., Orlando, FL (US); The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 15/419,558

(22) Filed: Jan. 30, 2017

(65) Prior Publication Data
US 2017/0139203 A1 May 18, 2017

Related U.S. Application Data

(60) Division of application No. 14/162,809, filed on Jan. 24, 2014, now Pat. No. 9,557,456, which is a
(Continued)

(51) Int. Cl.
*G02B 5/18* (2006.01)
*G02B 26/08* (2006.01)
(Continued)

(52) U.S. Cl.
CPC ....... *G02B 26/0808* (2013.01); *G02B 5/1828* (2013.01); *G02B 5/1866* (2013.01);
(Continued)

(58) Field of Classification Search
CPC ......... G02F 1/133528; G02F 1/133531; G02F 1/133538; G02B 1/08; G02B 5/18;
(Continued)

(56) References Cited

U.S. PATENT DOCUMENTS 2,435,616 A 2/1948 Vittum
3,721,486 A 3/1973 Bramley
(Continued)

FOREIGN PATENT DOCUMENTS

EP 1970734 9/2008
EP 2088456 12/2009
(Continued)

OTHER PUBLICATIONS

Sarkissian, et al., Periodically Aligned Liquid Crystal: Potential Application for Projection Displays, Mol. Cryst. Liq. Cryst., 2006, vol. 451, 19 pages.
(Continued)

*Primary Examiner* — Arnel C Lavarias
(74) *Attorney, Agent, or Firm* — Brian S. Steinberger; Law Offices of Brian S. Steinberger, P.A.

(57) ABSTRACT

Pointing and positioning system of light beams and images including a plurality of cycloidal diffractive waveplates, each waveplate capable of deviating a generally broadband light beam over a predetermined angle. The lateral translation and deviation angles of the light beams are controlled by controlling the relative distance, rotational position, and the diffraction efficiency of at least one in the plurality of waveplates.

5 Claims, 10 Drawing Sheets

Related U.S. Application Data continuation-in-part of application No. 13/916,627, filed on Jun. 13, 2013, now abandoned, which is a continuation of application No. 12/697,083, filed on Jan. 29, 2010, now abandoned.

(51) Int. Cl.
  *G02B 27/09* (2006.01)
  *G02B 27/42* (2006.01)

(52) U.S. Cl.
  CPC ..... *G02B 27/0944* (2013.01); *G02B 27/4261* (2013.01); *G02B 27/4272* (2013.01)

(58) Field of Classification Search
  CPC .......... G02B 2005/1804; G02B 5/1828; G02B 5/1833; G02B 5/1866; G02B 5/1871; G02B 5/30; G02B 5/3016; G02B 5/3025; G02B 5/3083; G02B 5/32; G02B 26/08; G02B 26/0808; G02B 27/106; G02B 27/1086; G02B 27/28; G02B 27/283; G02B 27/286; G02B 27/42; G02B 27/4272
  USPC ..... 359/573, 558, 566, 569, 483.01, 485.05, 359/487.03, 489.01, 489.06, 489.09, 359/489.08, 489.15, 490.01, 490.02, 359/490.03; 349/1, 18, 193, 194, 201, 349/202; 362/19; 353/20
  See application file for complete search history.

(56) References Cited

U.S. PATENT DOCUMENTS

| | | |
|---|---|---|
| 3,897,136 A | 7/1975 | Bryngdahl |
| 4,160,598 A | 7/1979 | Firester et al. |
| 4,301,023 A | 11/1981 | Schuberth |
| 4,698,816 A | 10/1987 | Chun |
| 4,956,141 A | 9/1990 | Allen |
| 4,983,332 A | 1/1991 | Hahn |
| 5,032,009 A | 7/1991 | Gibbons |
| 5,042,950 A | 8/1991 | Salmon, Jr. |
| 5,047,847 A | 9/1991 | Toda |
| 5,100,231 A | 3/1992 | Sasnett et al. |
| 5,142,411 A | 8/1992 | Fiala |
| 5,150,234 A | 9/1992 | Takahashi |
| 5,218,610 A | 6/1993 | Dixon |
| 5,325,218 A | 6/1994 | Willett |
| 5,446,596 A | 8/1995 | Mostrorocco |
| 5,621,525 A | 4/1997 | Vogeler et al. |
| 5,895,422 A | 4/1999 | Hauber |
| 5,903,330 A | 5/1999 | Funschilling |
| 5,989,758 A | 11/1999 | Komatsu et al. |
| 6,107,617 A | 8/2000 | Love et al. |
| 6,139,147 A | 10/2000 | Zhang |
| 6,191,880 B1 | 2/2001 | Schuster |
| 6,219,185 B1 | 4/2001 | Hyde |
| 6,320,663 B1 | 11/2001 | Ershov |
| 6,373,549 B1 | 4/2002 | Tombling |
| 6,452,145 B1 | 9/2002 | Graves et al. |
| 6,551,531 B1 | 4/2003 | Ford |
| 6,678,042 B2 | 1/2004 | Tabirian et al. |
| 6,728,049 B1 | 4/2004 | Tabirian et al. |
| 6,792,028 B2 | 9/2004 | Cook |
| 7,048,619 B2 | 5/2006 | Park |
| 7,094,304 B2 | 8/2006 | Nystrom |
| 7,095,772 B1 | 8/2006 | Delfyett et al. |
| 7,196,758 B2 | 3/2007 | Crawford |
| 7,319,566 B2 | 1/2008 | Prince |
| 7,324,286 B1 | 1/2008 | Glebov |
| 7,450,213 B2 | 11/2008 | Kim et al. |
| 7,764,426 B2 | 7/2010 | Lipson |
| 8,045,130 B2 | 10/2011 | Son |
| 8,077,388 B2 | 12/2011 | Gerton |
| 8,264,623 B2 | 9/2012 | Marrucci |
| 8,520,170 B2 | 8/2013 | Escuti |
| 8,582,094 B1 | 11/2013 | Shortt |
| 8,643,822 B2 | 2/2014 | Tan |
| 8,982,313 B2 | 3/2015 | Escuti |
| 9,541,772 B2 | 1/2017 | De Sio et al. |
| 9,557,456 B2 | 1/2017 | Tabirian et al. |
| 9,592,116 B2 | 3/2017 | De Sio et al. |
| 9,617,205 B2 | 4/2017 | Tabirian et al. |
| 9,658,512 B2 | 5/2017 | Tabirian et al. |
| 9,715,048 B2 | 7/2017 | Tabirian et al. |
| 9,753,193 B2 | 9/2017 | Tabirian et al. |
| 9,976,911 B1 | 5/2018 | Tabirian et al. |
| 9,983,479 B2 | 5/2018 | Tabirian et al. |
| 2001/0002895 A1 | 6/2001 | Kawano |
| 2001/0018612 A1 | 8/2001 | Carson et al. |
| 2001/0030720 A1 | 10/2001 | Ichihashi |
| 2002/0027624 A1 | 3/2002 | Seiberle |
| 2002/0097361 A1 | 7/2002 | Ham |
| 2002/0167639 A1 | 11/2002 | Coates |
| 2003/0021526 A1 | 1/2003 | Bouevitch |
| 2003/0072896 A1 | 4/2003 | Kwok |
| 2003/0152712 A1 | 8/2003 | Motomura |
| 2003/0206288 A1 | 11/2003 | Tabirian et al. |
| 2003/0214700 A1 | 11/2003 | Sidorin |
| 2003/0218801 A1 | 11/2003 | Korniski |
| 2004/0105059 A1 | 6/2004 | Ohyama |
| 2004/0165126 A1 | 8/2004 | Ooi |
| 2005/0030457 A1 | 2/2005 | Kuan et al. |
| 2005/0110942 A1 | 5/2005 | Ide |
| 2005/0219696 A1 | 10/2005 | Albert et al. |
| 2005/0271325 A1 | 12/2005 | Anderson et al. |
| 2006/0008649 A1 | 1/2006 | Shinichiro |
| 2006/0055883 A1 | 3/2006 | Morris et al. |
| 2006/0109532 A1 | 5/2006 | Savas |
| 2006/0221449 A1 | 10/2006 | Glebov et al. |
| 2006/0222783 A1 | 10/2006 | Hayashi |
| 2007/0032866 A1 | 2/2007 | Portney |
| 2007/0040469 A1 | 2/2007 | Yacoubian |
| 2007/0115551 A1 | 5/2007 | Spilman |
| 2007/0122573 A1 | 5/2007 | Yasuike |
| 2007/0132930 A1 | 6/2007 | Ryu et al. |
| 2007/0247586 A1 | 10/2007 | Tabirian |
| 2007/0258677 A1 | 11/2007 | Chigrinov |
| 2008/0226844 A1 | 9/2008 | Shemo |
| 2008/0278675 A1 | 11/2008 | Escuti |
| 2009/0002588 A1 | 1/2009 | Lee et al. |
| 2009/0073331 A1 | 3/2009 | Shi |
| 2009/0122402 A1 | 5/2009 | Shemo |
| 2009/0141216 A1 | 6/2009 | Marrucci |
| 2009/0256977 A1 | 10/2009 | Haddock |
| 2009/0257106 A1 | 10/2009 | Tan |
| 2009/0264707 A1 | 10/2009 | Hendricks |
| 2010/0003605 A1 | 1/2010 | Gil |
| 2010/0066929 A1 | 3/2010 | Shemo |
| 2011/0069377 A1 | 3/2011 | Wu et al. |
| 2011/0075073 A1 | 3/2011 | Oiwa |
| 2011/0085117 A1 | 4/2011 | Moon et al. |
| 2011/0097557 A1 | 4/2011 | May |
| 2011/0109874 A1 | 5/2011 | Piers et al. |
| 2011/0135850 A1 | 6/2011 | Saha et al. |
| 2011/0188120 A1 | 8/2011 | Tabirian et al. |
| 2011/0234944 A1 | 9/2011 | Powers |
| 2011/0262844 A1 | 10/2011 | Tabirian |
| 2012/0140167 A1 | 6/2012 | Blum |
| 2012/0162433 A1 | 6/2012 | Fuentes Gonzalez |
| 2012/0188467 A1 | 7/2012 | Escuti |
| 2013/0057814 A1 | 3/2013 | Prushinskiy et al. |
| 2013/0202246 A1 | 8/2013 | Meade |
| 2014/0055740 A1 | 2/2014 | Spaulding |
| 2014/0211145 A1 | 7/2014 | Tabirian |
| 2014/0252666 A1 | 9/2014 | Tabirian |
| 2015/0049487 A1 | 2/2015 | Connor |
| 2015/0081016 A1 | 3/2015 | De Sio et al. |
| 2015/0276997 A1 | 10/2015 | Tabirian |
| 2016/0023993 A1 | 1/2016 | Tabirian |

(56) References Cited

U.S. PATENT DOCUMENTS

| | | |
|---|---|---|
| 2016/0047955 A1 | 2/2016 | Tabirian et al. |
| 2016/0047956 A1 | 2/2016 | Tabirian et al. |
| 2017/0010397 A1 | 1/2017 | Tabirian et al. |

FOREIGN PATENT DOCUMENTS

| | | | |
|---|---|---|---|
| GB | 2209751 | 5/1989 | |
| JP | 2001142033 | 5/2001 | |
| JP | 2004226752 | 8/2004 | |
| WO | 2007122573 | 11/2007 | |
| WO | 2008130555 | 10/2008 | |
| WO | WO 2008130559 A2 * | 10/2008 | ........... G02F 1/1337 |

OTHER PUBLICATIONS

Zel'Dovich, et al., Devices for Displaying Visual Information Disclosure, Jul. 2000, 10 pages.
Blinov, et al., Electrooptic Effects in Liquid Crystal Materials, Springer-Verlag New York, 1994, 17 pages.
Crawford, et al., Liquid Crystals in Complex Geomeries; Formed by Polymer and Porous Networks, Taylor and Francis, 1996, 4 pages.
Sarkissian, et al., Potential Application of Periodically Aligned Liquid Crystal Cell for Projection Displays, Optical Society of America, 2005, 3 pages.
Nersisyan, et al., Optical Axis Gratings in Liquid Crystals and Their Use for Polarization Insensitive Optical Switching, Journal of Nonlinear Optical Physics & Materials, Mar. 2009, vol. 18, No. 1, 47 pages.
Nersisyan, et al., Polarization Insensitive Imaging Through Polarization Gratings, Optics Express, Feb. 2009, vol. 17, No. 3, 14 pages.
Sarkissian, et al., Polarization-Controlled Switching Between Diffraction Orders in Transverse-Periodically Aligned Nematic Liquid Crystals, Optics Letters, Aug. 2006, vol. 31, No. 5, 3 pages.
Oise, Optics in the Southeast, Technical Conference and Tabletop Exhibit, Nov. 12-13, 2003, Orlando, Florida, Optical Society of America, 9 pages.
Dierking, Polymer Network-Stabilized Liquid Crystals, Advanced Materials, 2000, vol. 12, No. 3, 15 pages.
Beam Engineering for Advaced Measurements Co., et al., PCT Application No. PCT/US2016/038666 filed Jun. 22, 2016, Notification of Transmittal of the International Search Report and the Written Opinion of the International Searching Authority, or the Declaration dated Oct. 10, 2016, 16 pages.
Marrucci, et al., Pancharatnam-Berry phase optical elements for wave front shaping in the visible domain, Appl. Phys. Lett. 88, 2006, 3 pages.
Sobolewska et al., "On the inscription of period and half period surface relief gratings in azobenzene-functionalized polymers", J. Phys. Chem., vol. 112 (15) Jan. 3, 2008, 10 pages.
Barrett et al., Model of laser driven mass transport in thin films of dye-functionalized polymers, J. Chem. Phys., vol. 109 (4), Jul. 22, 1998, 13 pages.
Tabirian, U.S. Appl. No. 14/214,375, filed Mar. 14, 2014, Office Action Summary dated Jun. 27, 2017, 10 pages.
Tabirian, et al., U.S. Appl. No. 14/688,425, filed Apr. 16, 2015, Office Action Summary dated Oct. 5, 2017, 10 pages.
Serak, et al. Diffractive Waveplate Arrays [Invited], Journal of the Optical Society of America B, May 2017, pp. B56-B63, vol. 34, No. 5, 8 pages.
Emoto, et al., Optical & Physical Applications of Photocontrollable Materials: Azobenzene-Containing & Liquid Crystalline Polymers,Polymers, Jan. 2012, 150-186, vol. 4, 38 pg.
Tabiryan, et al., The Promise of Diffractive Waveplates, OPN Optics and Photonics News, Mar. 2010, 6 pages.
Tabiryan, et al., Fabricating Vector Vortex Waveplates for Coronagraphy; Aerospace Conference, 2012, EEE; publicly available Apr. 19, 2012, 12 pages.
Tabirian, et al., PCT Application No. PCT/US15/26186 filed Apr. 16, 2015, Notification of Transmittal of the International Search Report and the Written Opinion of the International Searching Authority dated Jul. 14, 2015, 17 pages.
Nersisyan, et al., Study of azo dye surface command photoalignment material for photonics applications, Applied Optics, vol. 49, No. 10, Apr. 1, 2010, 8 pages.
Nersisyan, et al., Characterization of optically imprinted polarization gratings, Applied Optics, vol. 48, No. 21, Jul. 20, 2009, 6 pages.
Nersisyan, et al., Fabrication of Liquid Crystal Polymer Axial Waveplates for UV-IR Wavelengths, Optics Express, vol. 17, No. 14, Jul. 2009, 9 pages.
Sarkissian, et al., Longitudinally modulated nematic bandgap structure, Optical Society of America, vol. 23, No. 8, Aug. 2008, 6 pages.
Sarkissian, et al., Polarization-universal bandgap in periodically twisted nematics, Optics Letters, vol. 31, No. 11, Jun. 1, 2006, abstract, 4 pages.
Schadt, et al., Photo-Induced Alignment and Patterning of Hybrid Liquid Crystalline Polymer Films on Single Substrates, Jpn. J. Appl. Phys., vol. 34, Part 2, No. 6B, Jun. 15, 1995, 4 pages.
Schadt , et al., Photo-Generation of Linearly Polymerized Liquid Crystal Aligning Layers Comprising Novel, Integrated Optically Patterned Retarders and Color Filters, Jpn. J. Appl. Phys., vol. 34, Part 1, No. 6A, Jun. 1995, 10 pages.
Schadt, et al., Optical patterning of multi-domain liquid-crystal displays with wide viewing angles, Nature, vol. 381, May 16, 996, 4 pages.
Escuti, et al., A Polarization-Independent Liquid Crystal Saptial-Light-Modulator, Liquid Crystals X, Proc. of SPIE, vol. 6332, 2006, 9 pages.
Escuti, et al., Polarization-Independent LC Microdisplays Using Liquid Crystal Polarization Gratings: A Viable Solution (?), Dept of Electrical & Computer Engineering @ ILCC, Jul. 1, 2008, 30 pages.
Escuti, et al., Simplified Spectropolarimetry Using Reactive Mesogen Polarization Gratings, Imaging Spectrometry XI, Proc. of SPIE, vol. 6302, 2006, 11 pages.
Gibbons, et al., Surface-mediated alignment of nematic liquid crystals with polarized laser light, Nature, vol. 351, May 2, 1991, 1 page.
Gibbons, et al., Optically Controlled Alignment of Liquid Crystals: Devices and Applications, Molecular Crystals and Liquid Crystals, vol. 251, 1994, 19 pages.
Gibbons, et al., Optically generated liquid crystal gratings, Appl. Phys. Lett., 65, Nov. 14, 1994, 3 pages.
University of Central Florida, School of Optics Creol PPCE, Optics in the Southeast, Technical Conference and Tabletop Exhibit, Nov. 12-13, 2003, 9 pages.
Ichimura, et al., Surface assisted photoalignment control of lyotropic liquid crystals, Part 1, Characterization and photoalignment of aqueous solutions of a water soluble dyes as lyotropic liquid crystals, J. Materials. Chem., vol. 12, 2002, abstract, 2 pages.
Ichimura, et al., Reversible Change in Alignment Mode of Nematic Liquid Crystals Regulated Photochemically by "Command Surfaces" Modified with an Azobenzene Monolayer, American Chemical Society, Langmuir, vol. 4, No. 5, 1988, 3 pages.
Provenzano, et al., Highly efficient liquid crystal based diffraction grating induced by polarization holograms at the aligning surfaces, Applied Physics Letter 89, 2006, 4 pages.
Titus, et al., Efficient polarization-independent, re ective liquid crystal phase grating, Applied Physics Letter 71, Oct. 20, 1197, 3 pages.
Chen, et al. An Electrooptically Controlled Liquid-Crystal Diffraction Grating, Applied Physics Letter 67, Oct. 30, 1995, 4 pages.
Kim, et al., Unusual Characteristics of Diffraction Gratings in a Liquid Crystal Cell, Advanced Materials, vol. 14, No. 13-14, Jul. 4, 2002, 7 pages.
Pan, et al., Surface Topography and Alignment Effects in UV-Modified Polyimide Films with Micron Size Patterns, Chinese Journal of Physics, vol. 41, No. 2, Apr. 2003, 8 pages.
Fuh, et al., Dynamic studies of holographic gratings in dye-doped liquid-crystal films, Optics Letter, vol. 26, No. 22, Nov. 15, 2001, 3 pages.

(56) References Cited

OTHER PUBLICATIONS

Yu, et al., Polarization Grating of Photoaligned Liquid Crystals with Oppositely Twisted Domain Structures, Molecular Crystals Liquid Crystals, vol. 433, 2005, 7 pages.
Crawford, et al., Liquid-crystal diffraction gratings using polarization holography alignment techniques, Journal of Applied Physics 98, 2005, 10 pages.
Seiberle, et al., 38.1 Invited Paper: Photo-Aligned Anisotropic Optical Thin Films, SID 03 Digest, 2003, 4 pages.
Wen, et al., Nematic liquid-crystal polarization gratings by modification of surface alignment, Applied Optics, vol. 41, No. 7, Mar. 1, 2002, 5 pages.
Anagnostis, et al., Replication produces holographic optics in volume, Laser Focus World, vol. 36, Issue 3, Mar. 1, 2000, 6 pages.
Gale, Replicated Diffractive Optics and Micro-Optics, Optics and Photonics News, Aug. 2003, 6 pages.
McEldowney, et al., Creating vortex retarders using photoaligned LC polymers, Optics Letter, vol. 33, No. 2, Jan. 15, 2008, 3 pages.
Stalder, et al., Lineraly polarized light with axial symmetry generated by liquid-crystal polarization converters, Optics Letters vol. 21, No., 1996, 3 pages.
Kakichashvili, et al., Method for phase polarization recording of holograms, Sov. J. Quantum. Electron, vol. 4, No. 6, Dec. 1974, 5 pages.
Todorov, et al., High-Sensitivity Material With Reversible Photo-Induced Anisotropy, Optics Communications, vol. 47, No. 2, Aug. 15, 1983, 4 pages.
Attia, et al., Anisoptropic Gratings Recorded From Two Circularly Polarized Coherent Waves, Optics Communications, vol. 47, No. 2, Aug. 15, 1983, 6 pages.
Cipparrone, et al., Permanent polarization gratings in photosensitive langmuir blodget films, Applied Physics Letter, vol. 77, No. 14, Oct. 2, 2000, 4 pages.
Nikolova, et al., Diffraction Efficiency and Selectivity of Polarization Holographic Recording, Optica Acta: International Journal of Optics, vol. 31, No. 5, 1984, 11 pages.
Lee et al., "Generation of pretilt angles of liquid crystals on cinnamte-based photoalignment . . . ", Opt., Expr., vol. 17 (26) (Dec. 2009), abstract, 4 pages.
Yaroshchuk et al. "Azodyes as photoalignment agents for polymerizable liquid crystals", IDW'06 Digest vol. 1-3, 2006, 3 pages.
Chigrinov et al. "Anchoring properties of photoaligned azo-dye materials" Phys. Rev., E vol. 68, (Dec. 2003), 5 pages.
Pagliusi et al. Surface-induced photorefractivity in twistable nematics: toward the all-optical control of gain, Opt. Expr. vol. 16, Oct. 2008, 9 pages.
M. Honma, T. Nose, Polarization-independent liquid crystal grating fabricated by microrubbing process, Jpn. J. Appl. Phys., Part 1, Vol. 42, 2003, 3 pages.

Anderson, G., et al., Broadband Antihole Photon Sieve Telescope, Applied Optics, vol. 16, No. 18., Jun. 2007, 3 pages.
Early, J. et al., Twenty Meter Space Telescope Based on Diffractive Fresnel Lens, SPIE, U.S. Department of Energy, Lawrence Livermore National Laboratory, Jun. 2003, 11 pages.
Martinez-Cuenca, et al., Reconfigurable Shack-Hartmann Sensor Without Moving Elements,Optical Society of America, vol. 35, No. 9, May 2010, 3 pages.
Serak, S., et al., High-efficiency 1.5 mm Thick Optical Axis Grating and its Use for Laser Beam Combining, Optical Society of America, vol. 32, No., Jan. 2007, 4 pages.
Ono et al., Effects of phase shift between two photoalignment substances on diffration properties in liquid crystalline grating cells, Appl. Opt. vol. 48, Jan. 2009, 7 pgs.
Naydenova et al., "Diffraction form polarization holographic gratings with surface relief in side chain azobenzene polyesters" J. Opt. Soc. Am. B, vol. 15, (1998), 14 pages.
Oh et al., Achromatic polarization gratings as highly efficent thin-film polarizing beamsplitters for broadband light Proc. SPIE vol. 6682, (2007), 4 pages.
Nersisyan, S., et al., Polarization insensitive imaging through polarization gratins, Optics Express, vol. 17, No. 3, Feb. 2 ,2009, 14 pages.
Tabiryan, et al., Broadband waveplate lenses, Optics Express 7091, vol. 24, No. 7, Mar. 24, 2016, 12 pages.
Tabiryan, et al. Thin waveplate lenses of switchable focal length—new generation in optics, Optics Express 25783, vol. 23, No. 20, Sep. 19, 2015, 12 pages.
Tabiryan, et al. Superlens in the skies: liquid-crystal-polymer technology for telescopes, Newsroom, 2016, 2 pages.
Nersisyan, et al., The principles of laser beam control with polarization gratings introduced as diffractive waveplates, Proc. of SPIE, vol. 7775, 2010, 10 pages.
Heller, A Giant Leap for Space Telescopes, Foldable Optics, S&TR, Mar. 2003, 7 pages.
Beam Engineering for Advanced Measurements Co., PCT Application No. PCT/US2015026186, The Extended European Search Report, filed on Mar. 8, 2017, 13 pages.
Honma, et al., Liquid-Crystal Fresnel Zone Plate Fabricated by Microrubbing, Japanese Journal of Applied Phsyics, vol. 44, No. 1A, 2005, 4 pages.
Tabirian, N., et al., U.S. Appl. No. 61/757,259, filed Jan. 28, 2013, 29 pages.
Pepper, M. et al, Nonlinear Optical Phase Conjugation, IEEE, Sep. 1991, pp. 21-34, 14 pages.
Tabirian, N., Utility U.S. Appl. No. 14/194,808, filed Mar. 2, 2014, Office Action Summary dated Feb. 9, 2018, 10 pages.
Tabirian, N., Utility U.S. Appl. No. 14/324,126, filed Jul. 4, 2014, Office Action Summary dated Feb. 8, 2018, 13 pages.
Tabirian, N., U.S. Appl. No. 15/189,551, filed Jun. 22, 2016, Office Action Summary dated Feb. 27, 2018, 16 pages.

* cited by examiner

US 10,036,886 B2

BROADBAND OPTICS FOR MANIPULATING LIGHT BEAMS AND IMAGES

CROSS REFERENCE TO RELATED APPLICATIONS

This application is a Divisional patent application of U.S. patent application Ser. No. 14/162,809 filed Jan. 24, 2014, now U.S. Pat. No. 9,557,456, which is a Continuation In Part of U.S. patent application Ser. No. 13/916,627 filed Jun. 13, 2013, now Abandoned, which is a Continuation of U.S. patent application Ser. No. 12/697,083 filed Jan. 29, 2010 now abandoned. The entire disclosure of each of the applications listed in this paragraph are incorporated by specific reference thereto.

CLAIM OF PRIORITY

This invention claims priority to the publication S. R. Nersisyan, N. V. Tabiryan, D. M. Steeves, B. R. Kimball, "Optical Axis Gratings in Liquid Crystals and their use for Polarization insensitive optical switching," J. Nonlinear Opt. Phys. & Mat., 18, 1-47 (March 2009), incorporated herein by reference.

STATEMENT REGARDING FEDERALLY SPONSORED RESEARCH OR DEVELOPMENT

This invention was made with Government support under Contract No. W911QY-07-C-0032.

RIGHTS OF THE GOVERNMENT

The invention described herein may be manufactured and used by or for the Government of the United States for all governmental purposes without the payment of any royalty.

FIELD OF THE INVENTION

This invention relates to optical beam control and, in particular, to methods, systems, apparatus and devices for manipulating with light beams, including laser beams and beams with wide spectra and divergence angles, by translating them in the lateral direction and varying their propagation direction for optical switching, beam scanning, spectral modulation, optical tweezers, thermal seeker, imaging, information displays, and other photonics applications.

BACKGROUND OF THE INVENTION

The present invention relates to optical systems for controlling with propagation of light beams. Pointing and positioning systems are enabling components for most laser applications. Conventionally, this is accomplished using mirrors, scan wheels, optical wedges, and other two-axis gimbal arrangements as exemplified, for example, in the U.S. Pat. No. 7,319,566 to Prince et al. These opto-mechanical systems are complex, bulky and heavy for large area beams. For example, the prism apex angle, hence its thickness is increased to achieve larger deflection angles. The electromechanical systems for rotation, translation or oscillation of such mirrors, prisms, and other optical components require high electrical power for their operation. They are relatively slow and have limited range of angles that could be covered within given time period.

Thus, there is a need for thin, light-weight, fast, and inexpensive pointing, positioning, and switching systems for light beams, particularly, for laser beams. The state-of-the-art developments include all-electronics systems and rotating diffraction gratings. The all-electronics systems with no moving parts, as reviewed in P. F. McManamon, P. J. Bos, M. J. Escuti, J. Heikenfeld, S. Serati, H. Xie, E. A. Watson, A Review of Phased Array Steering for Narrow-Band Electrooptical Systems, Proceedings of the IEEE, Vol. 97, pages 1078-1096 (2009), require a large number of high efficiency diffraction gratings and spatial light modulators and/or electrically controlled waveplates. As a result, the overall transmission of these systems is reduced along with their radiation damage threshold, and their speed is limited by the speed of liquid crystal spatial light modulators and variable retarders.

Rotating diffraction gratings as described in J. C. Wyant, "Rotating diffraction grating laser beam scanner," Applied Optics, 14, pages 1057-1058 (1975), and in the U.S. Pat. No. 3,721,486 to Bramley, partially solves the problem of obtaining larger diffraction angle in thinner optical system, compared, for example to the system of Risley prisms. The light beam diffracted by the first grating in the path of the beam is further diffracted by the second grating. Depending on orientation of those gratings with respect to each other, the deflection angle of the beam can thus be varied between nearly 0 to double of the diffraction angle exhibited by a single grating. The problem with such systems is that phase gratings typically diffract light into multiple orders that need to be blocked along with the $0^{th}$ order beam. High efficiency Bragg type gratings have narrow spectral and angular range as described in the U.S. Pat. No. 7,324,286 to Glebov et al., and can be used practically for laser beams only, expanded and collimated to minimize divergence. Blazed gratings such as proposed in the U.S. Pat. No. 6,792,028 to Cook et al., still exhibit a multitude of diffraction orders due to their discontinuous structure and do not improve considerably on the width of angular selectivity and diffraction efficiency.

The cycloidal diffractive waveplates (CDWs), essentially, anisotropic plates meeting half-wave condition but with optical axis orientation rotating in the plane of the waveplate in a cycloidal manner, as described in the review S. R. Nersisyan, N. V. Tabiryan, D. M. Steeves, B. R. Kimball, "Optical Axis Gratings in Liquid Crystals and their use for Polarization insensitive optical switching," J. Nonlinear Opt. Phys. & Mat., 18, 1-47 (2009), do not have the disadvantages of conventional phase gratings. Moreover, DWs, referred to also as optical axis gratings and polarization gratings, can provide nearly 100% diffraction efficiency in micrometer thin layers. Furthermore, due to their waveplate nature, their diffraction spectrum is broadband, and can even be made practically achromatic. Due to their thinness and high transparency, they can be used in high power laser systems.

Thus, replacing Risley prisms, wedges, mirrors and/or phase gratings with DWs, provides many advantages for manipulating with light beams and imaging. As shown in S. R. Nersisyan, N. V. Tabiryan, L. Hoke, D. M. Steeves, B. Kimball, Polarization insensitive imaging through polarization gratings, Optics Express, 17, 1817-1830 (2009), not only laser beams, but complex images can be steered over large angles without light attenuation or image deformation. The paper further showed that utilizing a pair of closely spaced CDWs, one of them with switchable diffraction, it is possible to manipulate with transmission of unpolarized beams and images through apertures. This concept suggested and demonstrated in S. R. Nersisyan, N. V. Tabiryan, L. Hoke, D. M. Steeves, B. Kimball, "Polarization insensitive imaging through polarization gratings," Optics Express, 17, 1817-1830 (2009) was subsequently cited and tested in C. Oh, J. Kim, J. F. Muth, M. Escuti, "A new beam steering concept: Riesley gratings," Proc. SPIE, vol. 7466, pp. 74660J1-J8 (2009).

BRIEF SUMMARY OF THE INVENTION

Thus, the objective of the present invention is providing an optical system for translating light beams over predetermined distances and deviating over predetermined angles using a set of CDWs, the system generally being capable of controlling light beams of arbitrary polarization, wide wavelength spectrum and divergence angles, including images.

The second objective of the present invention is providing means for controlling the optical properties of said set of CDWs mechanically, by varying the relative distance and angular positions between the CDWs, as well as by using other stimuli such as electromagnetic fields and temperature that vary the diffraction efficiency of at least one CDW in the set.

A further objective of the present invention is providing an optical system wherein the light translated or deflected by the set of CDWs is further controlled with the aid of apertures, filters, and other optical elements.

DETAILED DESCRIPTION OF THE INVENTION

Before explaining the disclosed embodiment of the present invention in detail it is to be understood that the invention is not limited in its application to the details of the particular arrangement shown since the invention is capable of other embodiments. Also, the terminology used herein is for the purpose of description and not limitation.

Figure 1A:
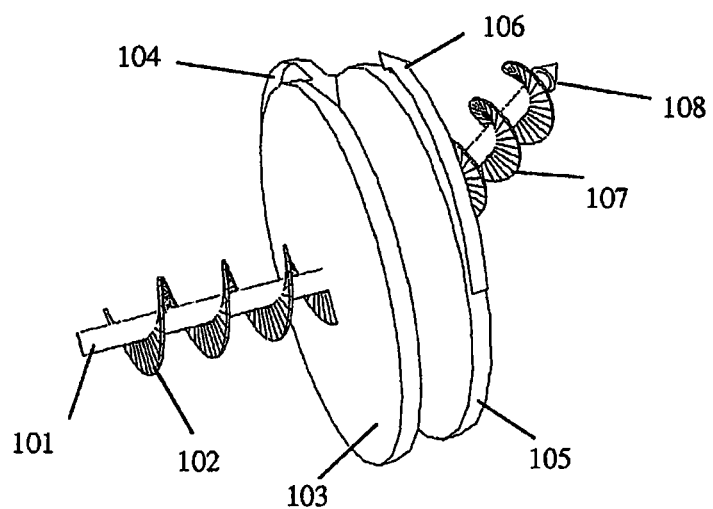
FIG. 1A schematically shows deflection of a circularly polarized light beam with a pair of diffractive waveplates.

The preferred embodiment of the present invention includes two CDWs (cycloidal diffractive waveplates), marked with numerals 103 and 105 in FIG. 1A, arranged parallel to each other in close proximity such as the light diffracted by the first CDW 103 is fully captured by the aperture of the second CDW 105. At the output of the set of CDWs 103 and 105, the pointing direction of the light beam 108 circularly polarized as indicated by spiral 107 is, in general, different from the propagation direction of the incident light beam 101 circularly polarized as indicated by spiral 102. The deflection angle of the beam is controlled by varying the relative geometrical positioning between the CDWs, for example, by mechanical rotation of the CDWs schematically shown by arrows 104 and 106.

Figure 1B:
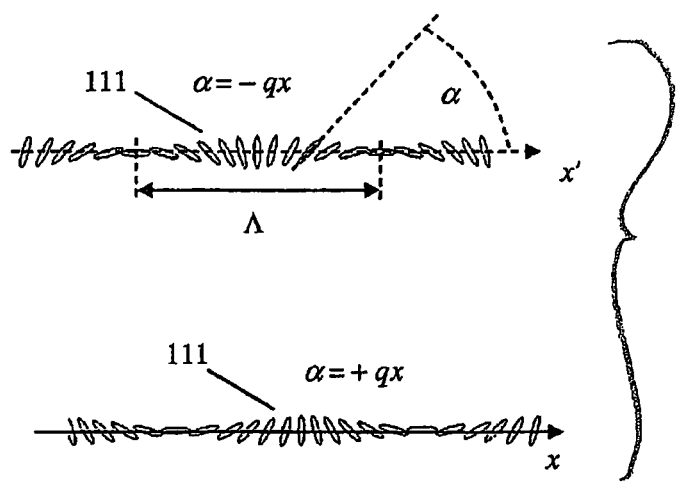
FIG. 1B describes the pattern of spatial modulation of optical axis orientation of a cycloidal diffractive waveplate along a single coordinate axis.
Figure 1C:
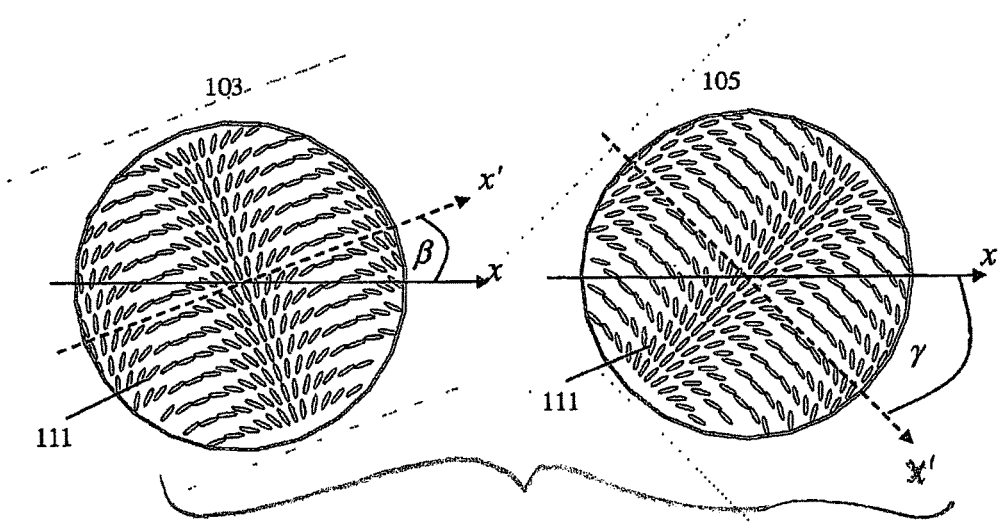
FIG. 1C schematically shows the structure of cycloidal diffractive waveplates at different rotational positions.
Figure 1D:
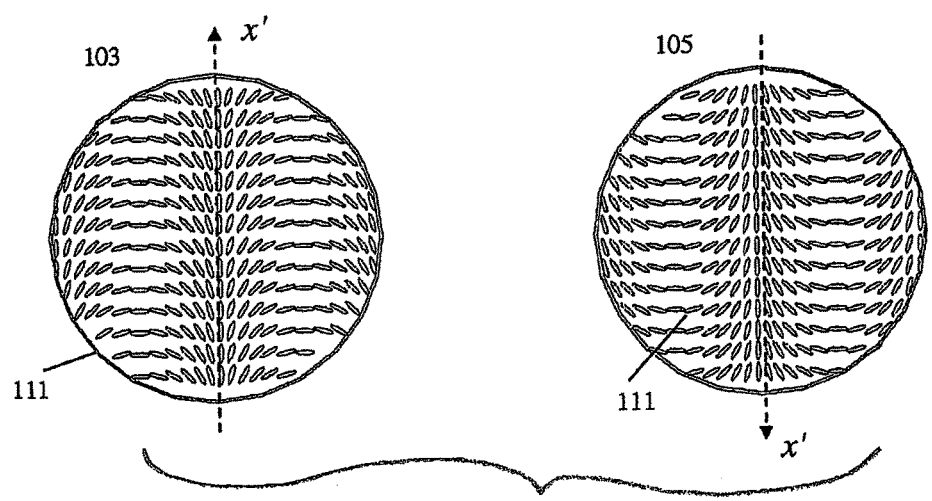
FIG. 1D schematically shows the structure of cycloidal diffractive waveplates at anti-parallel rotational positions.

It is convenient to depict the spatially modulated orientation direction of the optical axis in a CDW by elongated ellipses 111 as shown in FIG. 1B. The optical axis orientation angle $\alpha$ in a CDW varies along a single coordinate axis $x'$: $\alpha = qx'$. The modulation period $\Lambda$ defined by the wavevector q, $\Lambda = \pi/q$, determines the magnitude of the diffraction angle of the CDWs. The orientation angles $\beta$ and $\gamma$ of the $x'$-axes of the CDWs with respect to a fixed x-axis in the laboratory coordinate system, FIG. 1C, determine the diffraction direction. The minimum deflection angle is 0 and it is achieved for parallel arrangement of the CDWs wherein $\alpha = qx'$ for both CDWs. This corresponds to the case where $\beta = \gamma$ in FIG. 1C. The largest deflection angle is double of the diffraction angle produced by individual CDWs, and it is achieved for their anti-parallel arrangement, schematically shown in FIG. 1D, wherein $\gamma = \beta + \pi$.

Figure 2A:
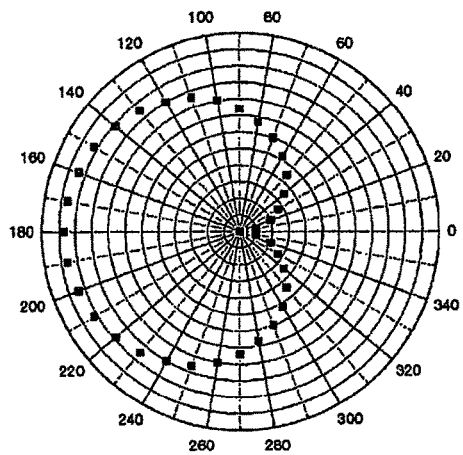
FIG. 2A shows sample dependence of the deflection angle of a light beam at the output of a pair of cycloidal diffractive waveplates as a function of the rotational angle between the waveplates.
Figure 2B:
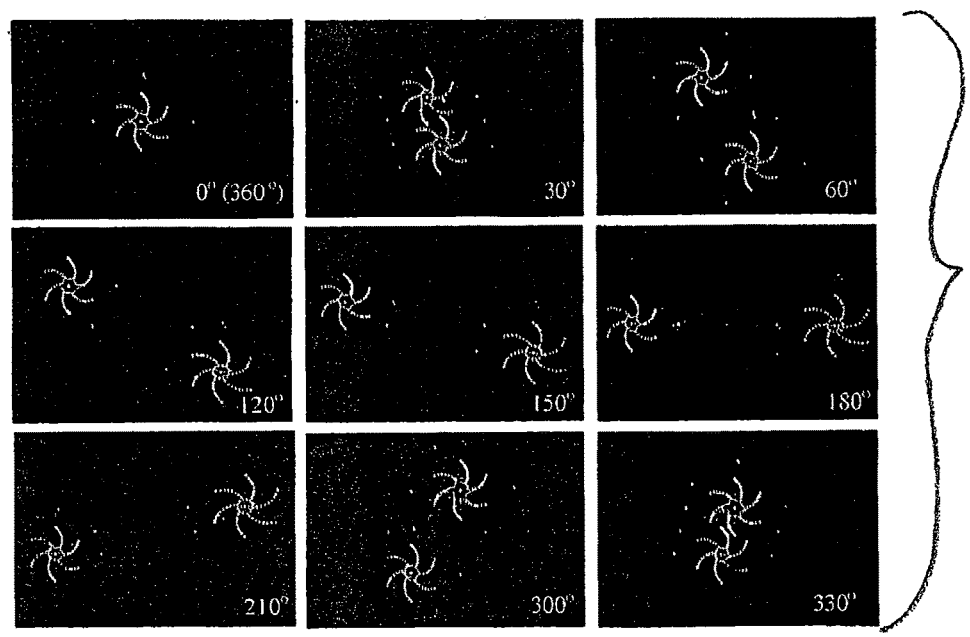
FIG. 2B demonstrates the capability of a pair of cycloidal diffractive waveplates to steer with no distortions complex images carried by an unpolarized light.

The plot of output angles measured for a sample system as a function of angular position between the CDWs in S. R. Nersisyan, N. V. Tabiryan, L. Hoke, D. M. Steeves, B. Kimball, "Polarization insensitive imaging through polarization gratings," Optics Express, 17 (3), 1817-1830 (2009) is shown in FIG. 2A for normal incidence of the beam on the first CDW. In the setup shown in FIG. 1A, the polarization of the incident beam is assumed circular, as schematically shown by the spiral 102. The output beam 108 in this case maintains the circular polarization state 107. In case of incident unpolarized or linearly polarized beam, two beams of orthogonal circular polarization are generated at the output of the system of two CDWs, FIG. 2B. The angle between those beams changes from 0 to four times the diffraction angle when the relative rotational position between the CDWs is varied from parallel to anti-parallel. This situation, along with the photos of the two diffracted beams corresponding to some intermediate relative rotational positions of the CDWs is demonstrated in FIG. 2B for beams carrying a complex image. No image distortions occur in this process.

In the preferred embodiment, CDWs are made of liquid crystal polymers though other optically anisotropic materials and material structures such as subwavelength gratings can be used as well. In general, the layer of CDW, typically only a few micrometer thick, is obtained as a coating on a substrate for stability and robustness. The substrate can be made of a material adequate for the particular application. As an example, a fused silica can be used when controlling UV light beams, and ZnSe, $BaF_2$ and silicon can be used for controlling laser beams of infrared wavelengths.

Figure 3:
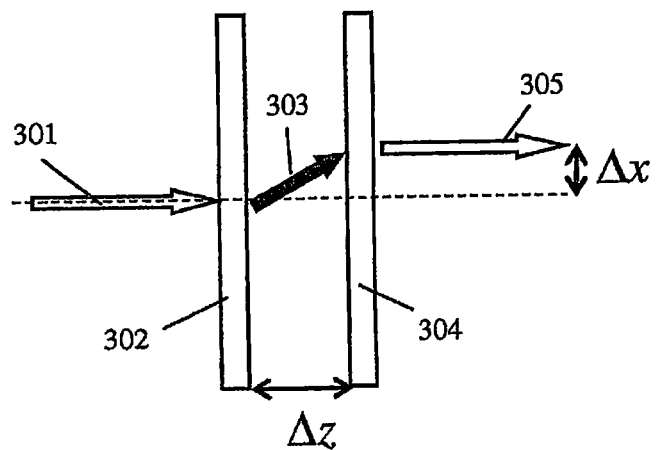
FIG. 3 schematically shows the displacement of a light beam by a pair of diffractive waveplates with parallel orientation of their optical axis modulation directions.
Figure 4A:
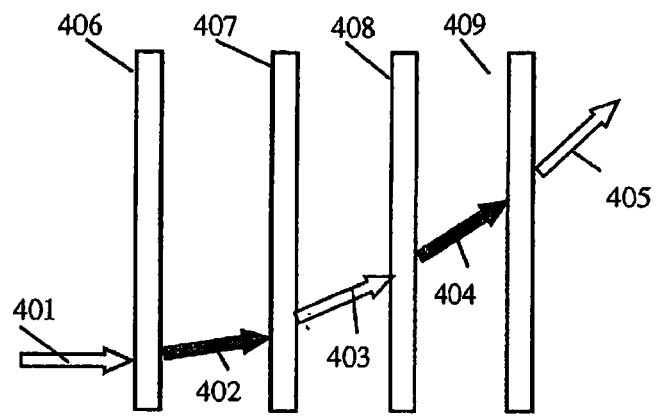
FIG. 4A schematically shows increasing of the deflection angle of a light beam by a set of four diffractive waveplates each arranged anti-parallel with respect to the previous one.
Figure 4B:
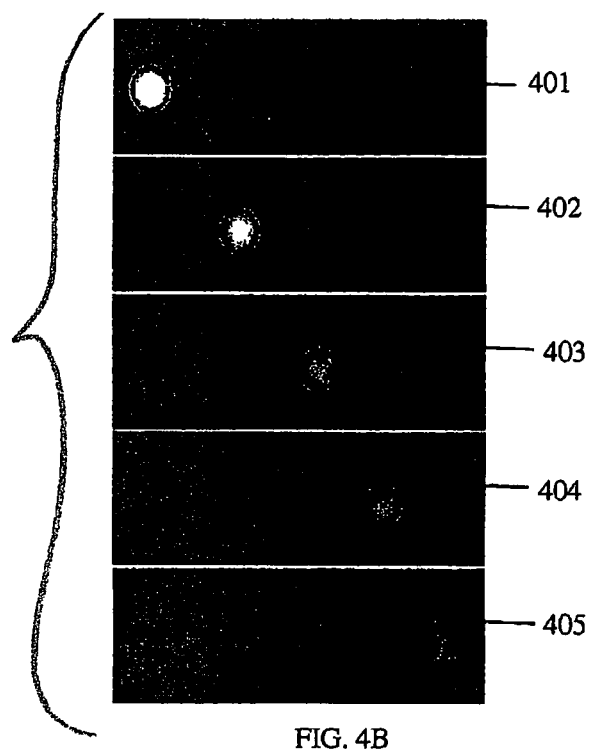
FIG. 4B demonstrates increasing deflection angle of a light beam by increasing the number of diffractive waveplates from one to four.
Figure 4C:
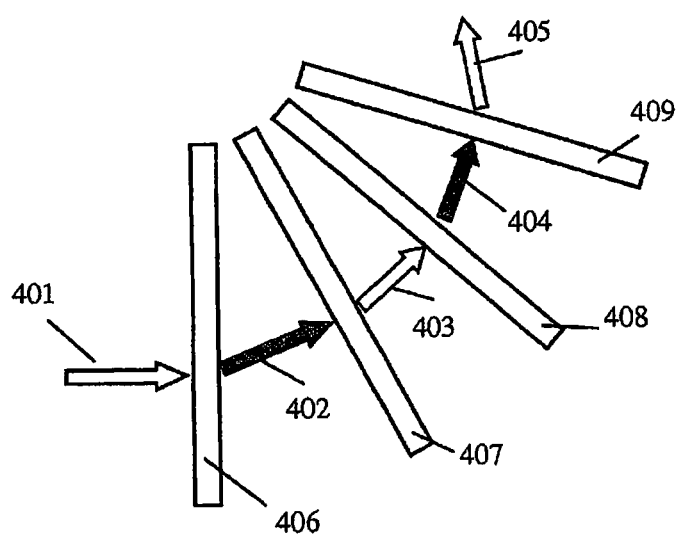
FIG. 4C shows increasing deflection angle of a light beam by a system of diffractive waveplates tilted with respect to each other.

Varying the distance $\Delta z$ between two parallel arranged identical CDWs 302 and 304, FIG. 3, introduces transverse shift $\Delta x$ of the beam 305 emerging from the system with respect to the position of the input beam 301 as a result of deflection of the beam 301 by the first CDW 302 into the beam 303 before it is further diffracted by the CDW 304. Said emerging beam 305 propagates parallel to the input beam 301. The beam can be translated over larger distances or steered over larger angles by adding CDWs into the set. Four CDWs, 406-409, are shown in FIG. 4A as an example. The input light 401 undergoes four deflections, 402-405. In order for each subsequent deflection to further increase the resultant deflection angle, the CDWs 407 and 409 have to be arranged anti-parallel to CDWs 406 and 408. A demonstration of light deflection by such a system of four CDWs is shown in FIG. 4B. CDWs can be tilted with respect to each other such as each of the subsequent CDWs is nearly perpendicular to the beam deflected by the previous CDW. The CDWs 407 and 409 in FIG. 4C are anti-parallel to the CDWs 406 and 408, and all four deflected beams 402-405 of the input beam 401 subsequently increase total deflection angle.

Figure 5A:
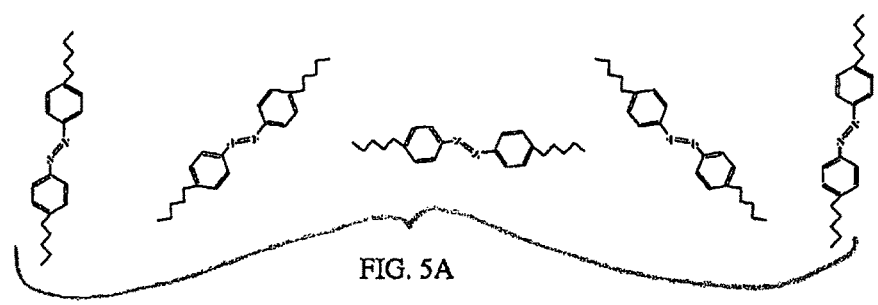
FIG. 5A schematically shows a fragment of a cycloidal orientation pattern for molecules of an azobenzene liquid crystal in trans-isomer state.
Figure 5B:
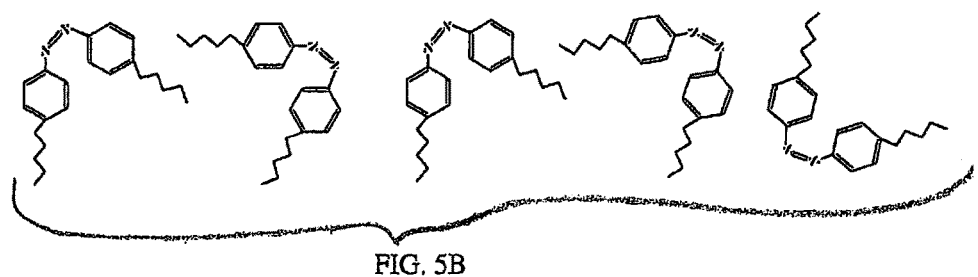
FIG. 5B schematically shows transformation of the trans isomer of azobenzene liquid crystal molecules into cis isomer state due to absorption of radiation, and respective loss of cycloidal pattern.

In another embodiment, the relative geometrical positioning of a light beam is controlled by incorporating in a set of CDWs one or more CDWs with variable diffraction efficiency and spectrum, particularly, switchable between diffractive and non-diffractive states at the influence of stimuli such as optical, thermal, electrical, or mechanical. For example, the variable CDW can be made of azobenzene liquid crystal that can be transformed into isotropic state due to trans-cis photoisomerization as shown in S. R. Nersisyan, N. V. Tabiryan, D. M. Steeves, B. R. Kimball, "Optical Axis Gratings in Liquid Crystals and their use for Polarization insensitive optical switching," J. Nonlinear Opt. Phys. & Mat., 18, 1-47 (2009). FIG. 5 demonstrates the effect of photoisomerization and temperature on the cycloidal alignment pattern of a CDW structure shown in FIG. 5A. In case of photoisomerization, FIG. 5B, the molecules of azobenzene liquid crystal isomerize into molecular structure with no mesogenic ability. Thus, the optical anisotropy of the material is reduced with accumulation of those cis-isomers and is eventually lost at sufficiently high concentration levels. For commercially available materials such as room temperature azobenzene liquid crystal 1005 (BEAM Co.), the energy required for full transformation into the isotropic state is of the order of 0.4 $J/cm^2$ for a light beam of 409 nm wavelength according to the product specifications. Azobenzene liquid crystal may also be used as a dopant to randomize a host liquid crystal orientation as a result of photoisomerization.

Figure 5C:
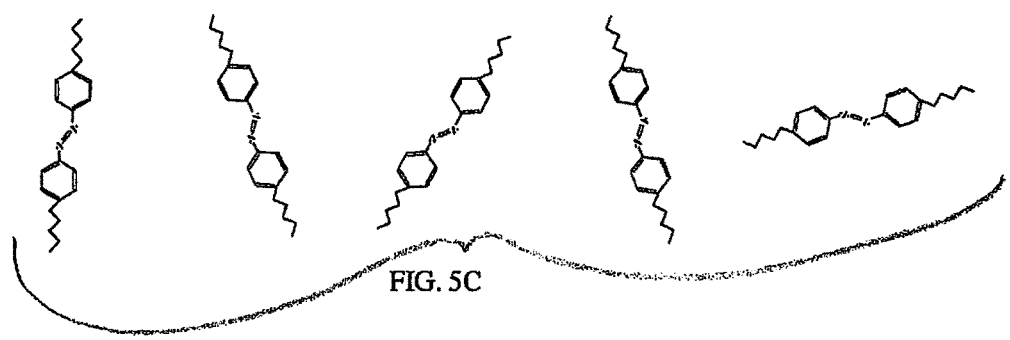
FIG. 5C schematically shows randomization of liquid crystal orientation due to temperature induced phase transition to isotropic liquid state, and related loss of cycloidal orientation pattern.

Similar process, reducing optical anisotropy till its complete disappearance may take place also when heating the liquid crystal to the isotropic state. In this case, the molecules of the liquid crystal do not isomerize, but lose the orientational order as shown in FIG. 5C. This phase transition temperature varies for different materials. For example, it is nearly equal to 35° C. for the nematic liquid crystal 4-pentyl-4'-cyanobiphenyl widely known under the trade name 5CB.

Figure 6A:
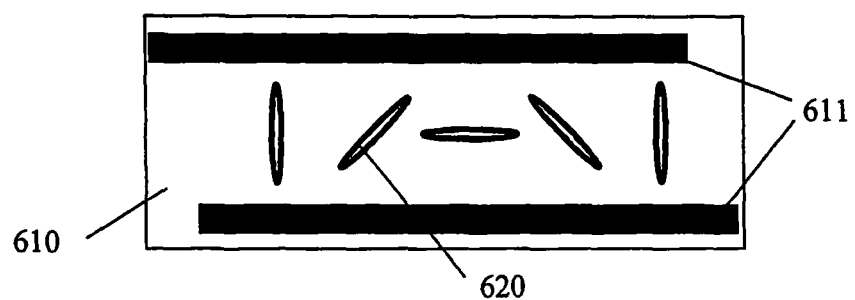
FIG. 6A schematically shows orientation of liquid crystal molecules between electrodes.
Figure 6B:
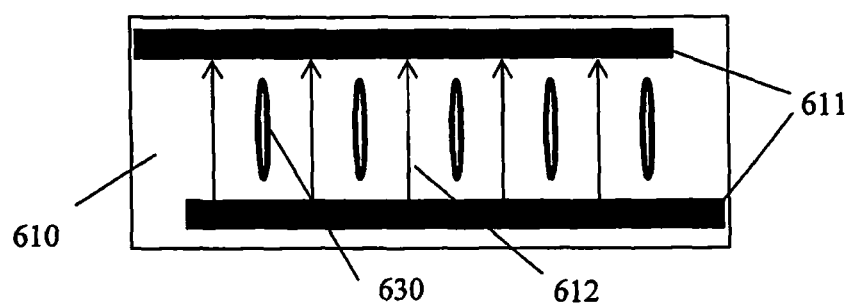
FIG. 6B schematically shows transformation of cycloidal orientation pattern into a homogeneous alignment pattern at the influence of an electric field.

Alternatively, spatially modulated orientation pattern in a CDW in a set can be transformed into homogeneous orientation state by electrical fields. In the preferred embodiment shown in FIG. 6, the electrodes 611 are deposited on one of the substrates 610 of a cell with cycloidal orientation of a liquid crystal 620. Application of an electric field 612 through the electrodes 611 aligns the liquid crystal molecules along the electric field thus transforming the diffractive structure of spatially modulated liquid crystal orientation into a homogeneous orientated non-diffractive state 630. Sinusoidal electric field at around 1 kHz frequency can be used for realignment with the strength of the field varying from nearly 1 V to 100 V depending on material properties and electrode spacing.

U.S. patent application Ser. No. 13/387,942 by Escuti assumes electric field applied across the liquid crystal layer, see, for example, FIG. 9B. This results in out-of-plane reorientation. Out-of-plane reorientation results in long transient light scattering states. Our invention relates with using in-plane reorientation by having the electrodes on one substrate of the liquid crystal phase modulator only. Our study has shown that, as opposed to out-of-plane reorientation of liquid crystal gratings, in-plane reorientation does not invoke generation of transient light scattering states.

Figure 7A:
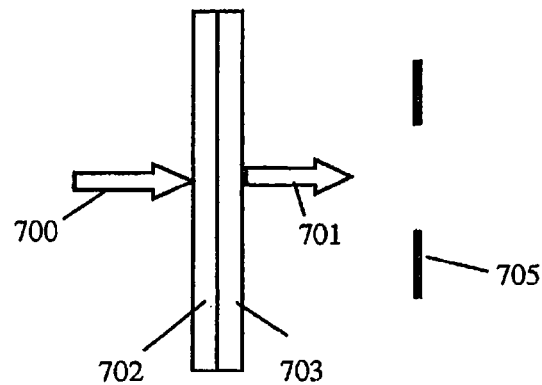
FIGS. 7A and B schematically show switching between transmittive and deflective states of a pair of cycloidal diffractive waveplates when switching one of the diffractive waveplates into an optically homogeneous non-diffractive state.

A preferred embodiment of a system for positioning a light beam with the aid of a variable CDW is shown in FIG. 7 when a CDW 703 with a fixed diffractive property is paired with a variable CDW 702 in parallel arrangement. As described above, according to S. R. Nersisyan, N. V. Tabiryan, L. Hoke, D. M. Steeves, B. Kimball, "Polarization insensitive imaging through polarization gratings," Optics Express, 17 (3), 1817-1830 (2009), the incident light beam 700 in this case, FIG. 7A, emerges from the set of CDWs as the beam 701 propagating along the propagation direction of the incident beam 700. As such, the beam 701 may propagate through the aperture 705.

Figure 7B:
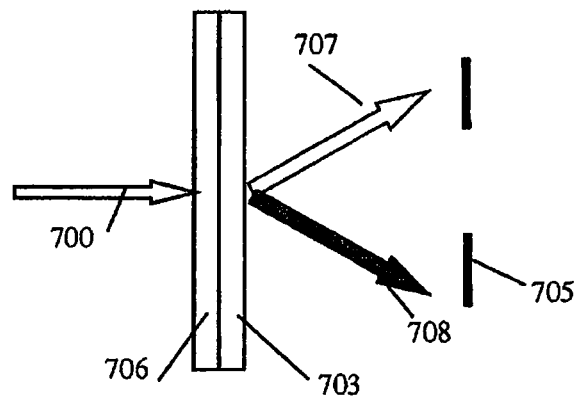

In case the CDW 702 is transformed into a non-diffractive state 706, FIG. 7B, the incident light 700 is deflected by the CDW 703 into the beams 707 and 708 for circular polarized beams of different handedness. Both diffraction orders, 707 and 708, shown in FIG. 7B are present for unpolarized or linearly polarized incident beam. The diffracted beams may be blocked from further propagation by the aperture 705.

Figure 8A:
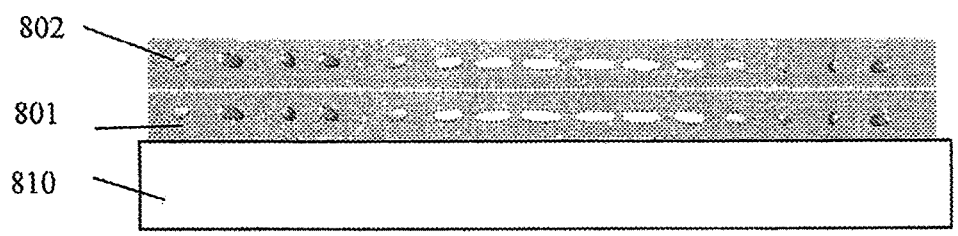
FIG. 8A schematically shows two layers of cycloidal diffractive waveplates bonded with each other on a single substrate.
Figure 8B:
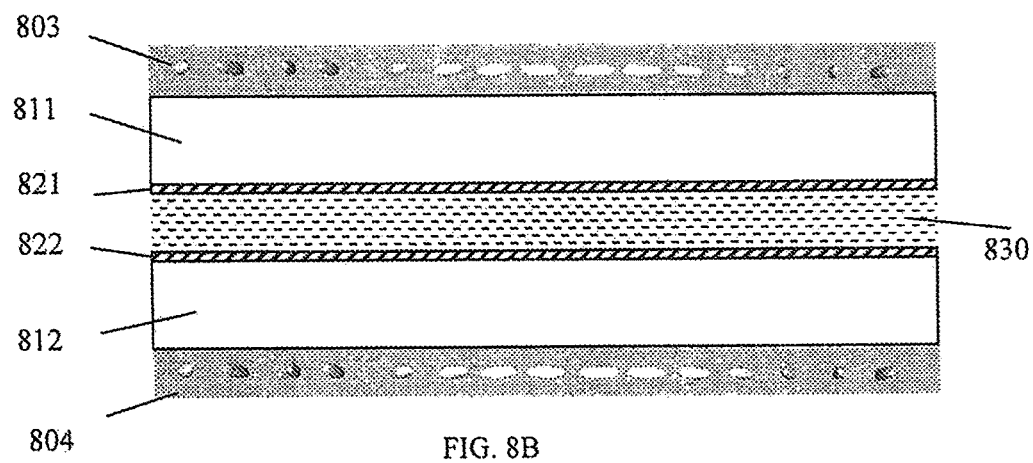
FIG. 8B schematically shows two layers of cycloidal diffractive waveplates bonded with each other with a liquid crystal cell acting as a spacer.

One advantage for controlling with pointing and positioning of light beams with the aid of variable CDWs is the opportunity for having a compact system where CDWs are physically attached to each other as schematically shown in FIG. 8A. Since each CDW layer is only a few micrometer thick, multiple layers of desired orientation and sequence can be deposited on a single support substrate. In a preferred embodiment, a variable liquid crystal polymer CDW 801 is deposited on a support substrate 810 and serves as basis for a second, not stimuli responsive CDW layer 802. In another preferred embodiment, the two CDW layers 803 and 804 in FIG. 8B are separated with a spacer layer that may, in general, be a functional layer by itself for performing functions such as spectral filtering and phase modulation. In the preferred embodiment shown in FIG. 8B the functional spacer is a liquid crystal 830 sandwiched between glass substrates 811 and 812 and acting as an electrically or optically controlled phase modulator. FIG. 8B shows the case of electrical control with said substrates having transparent electrodes 821 and 822.

The pointing and positioning functionality of the set of CDWs of the present invention can be extended to new applications by incorporating other optical components in the system, particularly, at its output. An optical system with variable transmission is an example of such functionality obtained, for example, by arranging an aperture 705 at the output of the set of CDWs shown in FIG. 7. In the preferred embodiment, the system is in high transmission state when both CDWs, 702 and 703, are in diffractive state. The system undergoes switching onto a low transmission state, FIG. 7B, as a result of switching the structure of one of the CDWs from diffractive state 702 onto a non-diffractive state 706 since the deflected beams are blocked by the aperture 705.

The same considerations apply to the CDW system shown in FIG. 8. Note that changing diffraction spectrum of the variable CDW system shown in FIG. 7 and FIG. 8, generally, results in changing spectrum of the light transmitted though the aperture 705.

Although the present invention has been described above by way of a preferred embodiment, this embodiment can be modified at will, within the scope of the appended claims, without departing from the spirit and nature of the subject invention.

What is claimed is:

1. A system for positioning light beams comprising:
   (a) at least one light source, each light source for generating a light beam;
   (b) a set of at least two cycloidal diffractive waveplates for deviating the light beam over a predetermined angle; and
   (c) a device controlling a relative geometrical positioning of said cycloidal diffractive waveplates, for varying a deflection angle of the beam.

2. The system as in claim 1 wherein a diffraction spectrum of at least one in the set of cycloidal diffractive waveplates is variable at an influence of one or a combination of the following stimuli: electric field, optical radiation, temperature and mechanical stress.

3. The system as in claim 2 further comprising means for applying and controlling said stimuli.

4. The system of claim 1 wherein the device for controlling the relative geometrical positioning of said cycloidal diffractive waveplates includes one or a combination of mechanical rotation assembly and a translation assembly.

5. The system of claim 1 wherein said cycloidal diffractive waveplates diffract light with near 100% efficiency in at least 300 nm wide spectrum of wavelengths.

* * * * *